United States Patent
Dow et al.

(10) Patent No.: US 9,996,377 B2
(45) Date of Patent: Jun. 12, 2018

(54) VIRTUAL MACHINE MIGRATION VIA A MOBILE DEVICE

(71) Applicant: International Business Machines Corporation, Armonk, NY (US)

(72) Inventors: Eli M. Dow, Wappingers Falls, NY (US); James P. Gilchrist, Poughkeepsie, NY (US); Steven K. Schmidt, Hinesburg, VT (US); Charles J. Stocker, IV, Plainsboro, NJ (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 149 days.

(21) Appl. No.: 14/754,905

(22) Filed: Jun. 30, 2015

(65) Prior Publication Data

US 2017/0003990 A1    Jan. 5, 2017

(51) Int. Cl.
| | |
|---|---|
| *G06F 9/45* | (2006.01) |
| *G06F 9/455* | (2018.01) |
| *G06F 15/16* | (2006.01) |
| *G06F 17/30* | (2006.01) |
| *G06F 21/64* | (2013.01) |

(52) U.S. Cl.
CPC .. *G06F 9/45558* (2013.01); *G06F 2009/4557* (2013.01); *G06F 2009/45587* (2013.01); *G06F 2009/45595* (2013.01)

(58) Field of Classification Search
CPC ........ G06F 9/45558; G06F 9/45; G06F 9/455; G06F 9/16; G06F 9/30
See application file for complete search history.

(56) References Cited

U.S. PATENT DOCUMENTS

| | | |
|---|---|---|
| 7,292,588 B2 | 11/2007 | Milley et al. |
| 7,526,286 B1 | 4/2009 | Allen, Jr. et al. |
| 7,707,399 B2 | 4/2010 | Peters |
| 8,527,679 B2 | 9/2013 | Suh et al. |
| 8,578,076 B2 | 11/2013 | Van Der Linden et al. |

(Continued)

OTHER PUBLICATIONS

Eli M. Dow et al., Pending U.S. Appl. No. 14/840,081 entitled "Virtual Machine Migration Via a Mobile Device," filed Aug. 31, 2015.

(Continued)

*Primary Examiner* — Li B Zhen
*Assistant Examiner* — Mohammad Kabir
(74) *Attorney, Agent, or Firm* — Cantor Colburn LLP

(57) ABSTRACT

Embodiments relate to virtual machine (VM) migration via a mobile device. A method includes requesting, by a mobile device, a source computer to capture a state and memory contents of a VM executing on the source computer. The VM includes the state, the memory contents, and data. The state and memory contents of the VM are stored on the mobile device. Security information about a target computer is determined by the mobile device. A migration of the VM to the target computer is initiated by the mobile device. The initiating includes sending the stored state and memory contents of the VM from the mobile device to the target computer. An activation of the VM on the target computer is initiated and access is provided to at least a subset of the data of the VM. The subset is selected based on the security information.

18 Claims, 5 Drawing Sheets

(56) References Cited

U.S. PATENT DOCUMENTS

| | | | |
|---|---|---|---|
| 8,635,396 B2 | 1/2014 | Doe et al. | |
| 8,661,211 B2 | 2/2014 | Dow | |
| 8,671,256 B2 | 3/2014 | Dow | |
| 8,694,990 B2 | 4/2014 | Dow et al. | |
| 9,003,409 B2 | 4/2015 | Dow et al. | |
| 9,015,715 B2 | 4/2015 | Dow et al. | |
| 2009/0037909 A1 | 2/2009 | Xu | |
| 2009/0204964 A1* | 8/2009 | Foley | G06F 21/53 718/1 |
| 2012/0069199 A1* | 3/2012 | Chang | G06K 9/00 348/207.1 |
| 2012/0227058 A1 | 9/2012 | Hunt et al. | |
| 2013/0054734 A1* | 2/2013 | Bond | G06F 9/4856 709/217 |
| 2013/0086465 A1 | 4/2013 | Boudville | |
| 2013/0136263 A1* | 5/2013 | Maity | H04L 63/08 380/278 |
| 2013/0238786 A1* | 9/2013 | Khesin | H04L 67/34 709/224 |
| 2013/0268580 A1 | 10/2013 | Vilke et al. | |
| 2013/0322335 A1 | 12/2013 | Smith | |
| 2013/0346978 A1 | 12/2013 | Jiang et al. | |
| 2014/0059642 A1 | 2/2014 | Deasy et al. | |
| 2014/0258533 A1* | 9/2014 | Antony | H04L 29/08144 709/226 |
| 2015/0150141 A1* | 5/2015 | Szymanski | G06Q 30/0635 726/26 |
| 2015/0268989 A1* | 9/2015 | Busch | G06F 9/4856 711/103 |
| 2015/0373096 A1* | 12/2015 | Chandrasekaran | H04W 4/023 709/226 |

OTHER PUBLICATIONS

List of IBM Patents or Patent Applictions Treated as Related; (Appendix P), Filed Aug. 31, 2015,.

Cho et al., "Real user-environment migration between heterogeneous ISA platforms." Proceedings of the 6th International Conference on Ubiquitous Information Management and Communication. ACM, 2012, 9 pages.

Kumar et al., "A survey of computation offloading for mobile systems." Mobile Networks and Applications 18.1 (2013), 12 pages.

Sud et al., "Dynamic migration of computation through virtualization of the mobile platform." Mobile Networks and Applications 17.2 (2012), 10 pages.

* cited by examiner

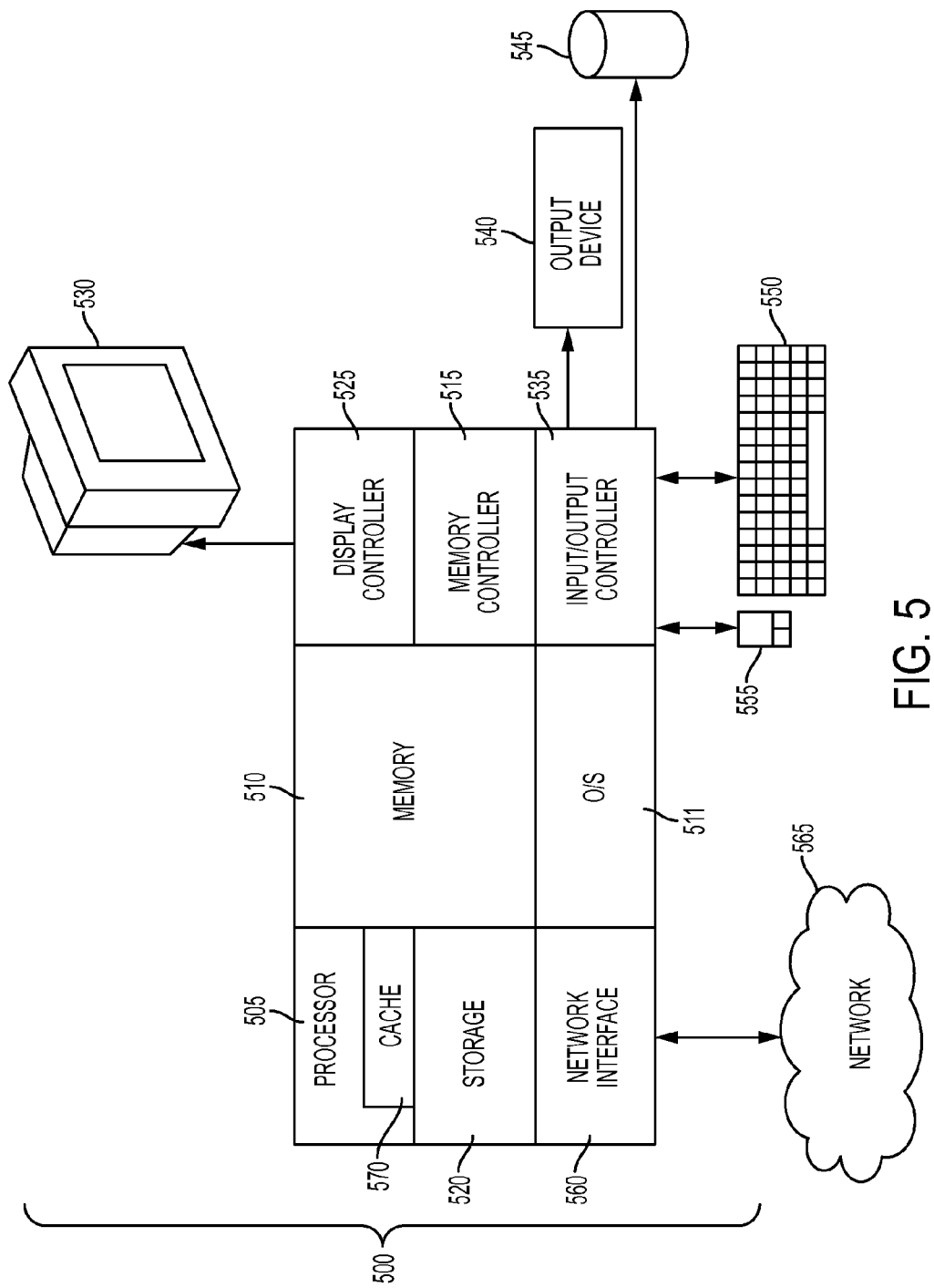

VIRTUAL MACHINE MIGRATION VIA A MOBILE DEVICE

BACKGROUND

The present disclosure relates to management of virtual machines (VMs) and, more specifically, to using a mobile device for VM migration.

A VM is a software implementation of a machine (i.e., a computer) that executes programs like a physical machine. The VM typically emulates a physical computing environment, but requests for central processing unit (CPU), memory, hard disk, network and other hardware resources are managed by a virtualization layer which translates these requests to the underlying physical hardware. VMs are created within a virtualization layer, such as a hypervisor or a virtualization platform that runs on top of a client or server operating system. System migrations of VMs are performed for a variety of reasons, including the ability to provide a back-up system while hardware and/or software upgrades are being installed. System migrations are also performed to move the VM to a new processor or other hardware. During a VM migration, the VM that is being copied is typically referred to as the source VM and the VM that is being built as a result of the migration is referred to as the target VM. There are a variety of methods for performing the migration including halting execution of the source VM to perform the migration, and migrating while the source VM is executing.

SUMMARY

According to an embodiment, a method, system, and computer program product for virtual machine (VM) migration via a mobile device are provided. The method includes requesting, by a mobile device, a source computer to capture a state and memory content of a VM executing on the source computer. The VM includes the state, the memory contents, and data. The state and memory contents of the VM are stored on the mobile device. Security information about a target computer is determined by the mobile device. A migration of the VM to the target computer is initiated by the mobile device. The initiating includes sending the stored state and memory contents of the VM from the mobile device to the target computer. An activation of the VM on the target computer is initiated and access is provided to at least a subset of the data of the VM. The subset is selected based on the security information.

Additional features and advantages are realized through the techniques of the present invention. Other embodiments and aspects of the invention are described in detail herein and are considered a part of the claimed invention. For a better understanding of the invention with the advantages and the features, refer to the description and to the drawings.

BRIEF DESCRIPTION OF THE DRAWINGS

The subject matter which is regarded as the invention is particularly pointed out and distinctly claimed in the claims at the conclusion of the specification. The forgoing and other features, and advantages of the invention are apparent from the following detailed description taken in conjunction with the accompanying drawings in which:

FIG. 5 is a block diagram of a computer system for VM migration in accordance with an embodiment.

DETAILED DESCRIPTION

Exemplary embodiments relate to virtual machine (VM) migration using a mobile device such as a mobile telephone (e.g., cellular telephone). As described herein, a user of a mobile telephone can utilize embodiments to migrate a VM currently executing on a home workstation of the user to the mobile telephone. The user can then take the mobile telephone to a second location, and utilize embodiments described herein to download and activate the VM on a workstation at the second location. Thus, the user can avoid having to carry the workstation (e.g., a laptop) to the second location.

The migration of the VM from a workstation at a first location (e.g., the user's home) can include transferring the VM state and the VM memory content to the mobile device (e.g., the mobile telephone). Embodiments can utilize network attached storage (NAS) to store the VM data, either on the mobile device or on a centralized storage location via a network, and thus, in some embodiments there is no need to transfer the data to the mobile device as part of the VM migration. The VM data is typically persistent data stored, for example, in a file system. This is contrasted with the transient data such as the CPU state (e.g., registers) and memory contents. In embodiments, the security metadata requirements for running the VM can be transmitted to the mobile device and later used in a security authorization stage prior to initiating a VM transmission from either the mobile device or transmitting the uniform resource identifier (URI) and security information needed to access the VM from a remote web service.

The second location can be a public place, such as a coffee shop or library, and the workstation at the second location can be a public workstation (i.e., provided by the second location for its patrons). In accordance with an embodiment, the public workstation generates an image encoding security and physical properties of the host attached hardware resources and system configuration parameters such as networking configuration data as well as any relevant software configuration of the hypervisor that is intended to receive virtual machines (e.g., pass through capabilities, hypervisor type and version number, migration protocols understood etc.) The mobile device then can determine any security restrictions associated with the public workstation. In an embodiment, the mobile device, based on the established security restrictions, can migrate the VM memory contents and the VM state to the public workstation. In addition, the mobile device can set up the appropriate tunnels for the public workstation to the NAS.

Figure 1:
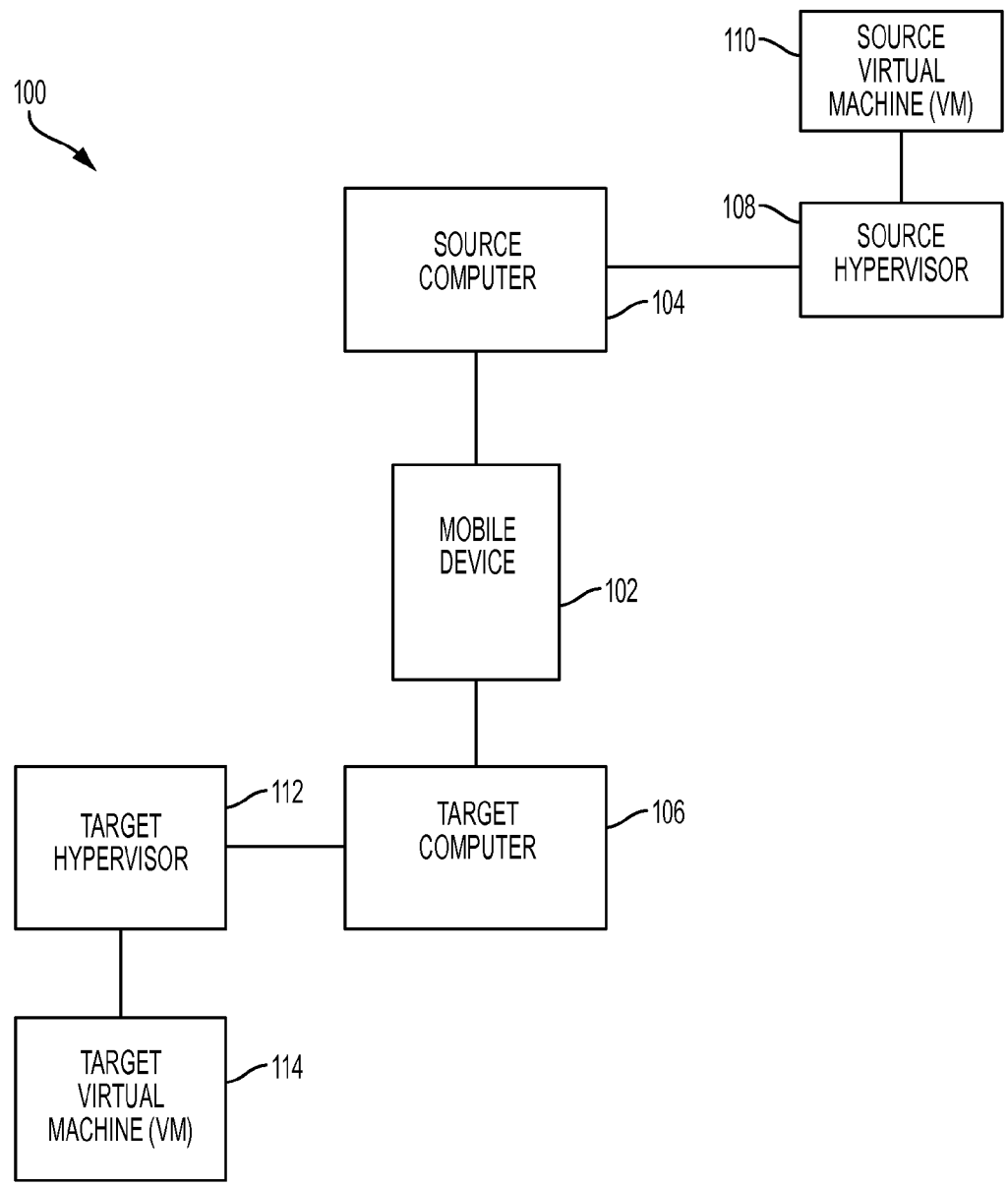
FIG. 1 is a block diagram of a system for performing virtual machine (VM) migration using a mobile device in accordance with an embodiment.

Turning now to FIG. 1, a block diagram of a system 100 for performing VM migration using a mobile device is generally shown in accordance with an embodiment. FIG. 1 includes a source computer 104 that can be implemented by any processor known in the art such as, but not limited to a personal computer, laptop computer, workstation, minicomputer, or mainframe computer. As shown in FIG. 1, the source computer 104 executes a source hypervisor 108 and source VM 110. The term "hypervisor" as used herein and as known in the art refers to a low-level application that supports execution of one or more VM. In exemplary embodiments, the source hypervisor 108 executes migration code that packages one or more source VMs 110 for storage on a mobile device 102.

As described previously, during a VM migration, the VM that is being copied is typically referred to as the source VM 110 and the VM that is being built as a result of the migration is referred to as the target VM 114. Similarly, the host where the source VM 110 is executing is typically referred to as the source host, or source computer 104. The source computer 104 executes the source hypervisor 108 that is executing the source VM 110. In addition, the host where the target VM 114 is executing is typically referred to as the target host, or target computer 106. The target computer 106 executes the target hypervisor 112 that is executing the target VM 114.

The mobile device 102 can be implemented by any portable computing device such as, but not limited to a mobile telephone, a personal digital assistant, a tablet computer, and a smart watch or other wearable personal computing device. The mobile device 102 can be directly or wirelessly connected to the source computer 104 for requesting the VM migration and for receiving the packaged source VM. In exemplary embodiments, the mobile device 102 executes migration code that requests the source computer 104 to migrate the source VM 110, to store the packaged VM, to perform a security check on the target computer 106, and to initiate the activation of the target VM 114 on the target computer 106. In addition, the mobile device 102 can store data associated with the source VM 110 and the resulting target VM 114. Thus, the mobile device 102 can act as a NAS and store data such as, but not limited to application data. This allows the user to use the mobile device 102 as a transient storage medium for the VM contents in whole or in part. Consider the non-limiting example of the VM data (e.g., the persistent disk image and file system) remaining on the mobile device 102. Under this embodiment the trust placed in the target computer 106/target hypervisor 112 is explicitly limited to access to that data which is actively in memory or in the central processing unit (CPU) state and explicitly omits file system data since the target hypervisor 112 and target computer 106 can only access that information which has been migrated to the target computer 106. Using the mobile device 102 as a NAS can prevent possible needless exposure of VM data to the target computer 106 as compared to an embodiment where the entire VM including the VM data (e.g., persistent disk storage) is migrated to the target hypervisor 112 running on the target computer 106.

Also shown in FIG. 1 is a target computer 106 that can be implemented by any processor known in the art such as, but not limited to a personal computer, laptop computer, workstation, minicomputer, or mainframe computer. As shown in FIG. 1, the target computer 106 executes a target hypervisor 112 and a target VM 114. In exemplary embodiments, the target hypervisor 112 executes migration code that activates the target VM 114 based on the packaged VM received from the mobile device 102. The mobile device 102 can be directly or wirelessly connected to the target computer 106.

Figure 2:
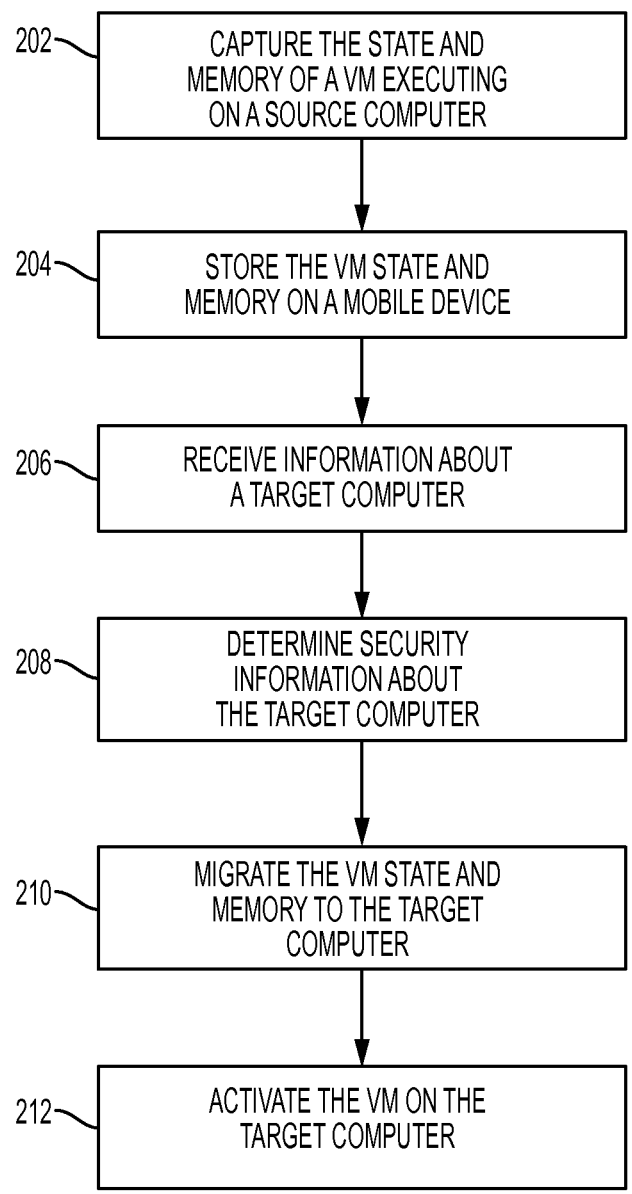
FIG. 2 illustrates a process flow for performing VM migration using a mobile device.

Turning now to FIG. 2, a process flow 200 for performing VM migration using a mobile device is generally shown in accordance with an embodiment. At block 202, the current state and memory contents of a source VM, such as source VM 110, executing on a source computer 104 is captured and at block 204, stored on a mobile device, such as mobile device 102. Blocks 202 and 204 can be executed in response to a request from the mobile device. Embodiments can utilize any known manner of capturing and storing a current state and memory contents of the source VM 110. For example, U.S. Pat. No. 8,671,256 describes migrating contents of a memory on a VM by performing an iterative process of copying changed memory contents to a source machine until the number of changes is less than a threshold. At this point, the VM is paused or quiesced on the source computer 104, a final iteration of the memory copy process is undertaken including the additional CPU state such as register values, and the VM is started on the target computer 106. At such time as operation is resumed on the target VM 114, the source hypervisor 108 is informed by the target hypervisor 112, and the source VM 110 is destroyed on the source hypervisor 108. A similar process can be utilized by embodiments described herein with the contents of the memory on the source VM 110 being stored on the mobile device 102 in a suspended or running state. Once the iterative process of copying the changed memory contents is completed, the state of the source VM 110 at the time that the last memory content was copied can be captured and stored on the mobile device 102. The state includes information that is utilized to restart the VM on a target machine such as, but not limited to registers, hardware buffers such as network card buffers, input/output (I/O) caches, and/or other transient storage.

At block 206, the mobile device 102 receives information about a target computer, such as target computer 106. The information can include identifying data such as a network address of the target computer 106. The information can also include information from a target hypervisor 112 executing on the target computer 106 such as, but not limited to, available memory and CPU, in order to ensure that a migration from the mobile device 102 to the target computer 106 can occur. At block 208, the mobile device determines security information about the target computer 106. One embodiment of a process for determining security information about the target computer 106 is described below in reference to FIG. 3. At block 210 in FIG. 2, the VM state and memory contents are migrated to the target computer and the VM is activated on the target computer at block 212. In an embodiment, the activating at block 212 includes providing access to the VM data.

Figure 3:
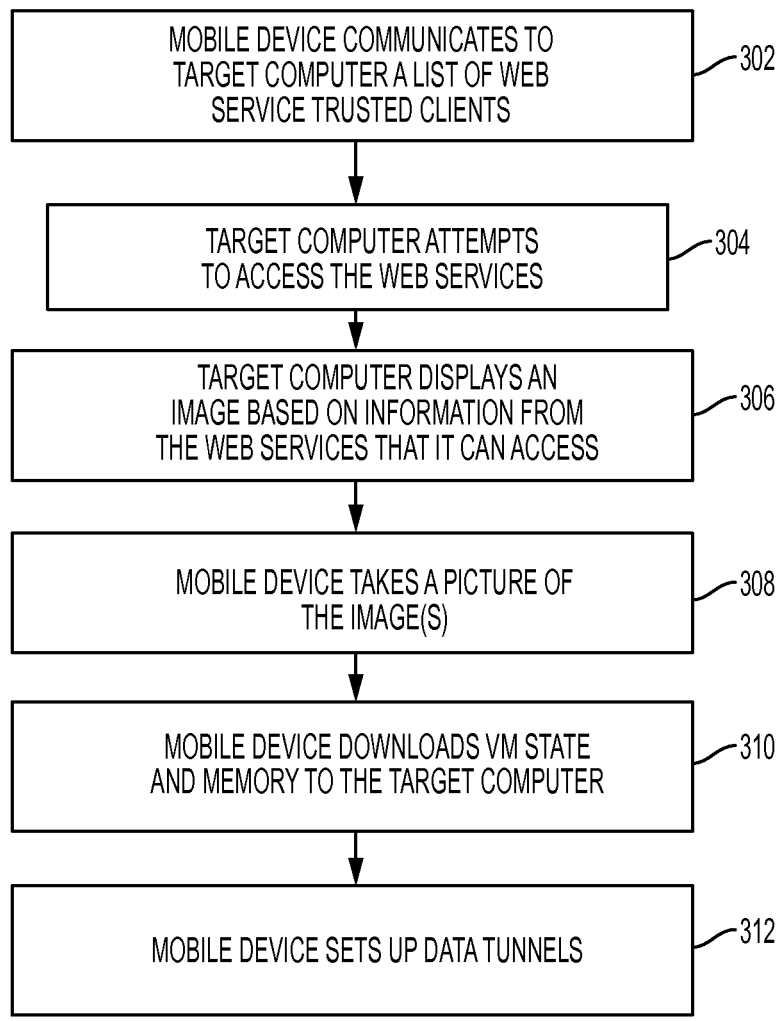
FIG. 3 illustrates a process flow for determining security for performing VM migration using a mobile device in accordance with an embodiment.

Turning now to FIG. 3, a process flow 300 for determining security for performing VM migration using a mobile device is generally shown in accordance with an embodiment. At block 302, the mobile device 102 communicates to the target computer 106 a list of one or more web service trusted clients, and at block 304 the target computer 106 attempts to access the web services on the list. The target computer 106 can attempt to access a web service using a user principal (e.g., e-mail or intranet), which generates an image (e.g., a QR code or picture) to be displayed on a user interface (e.g. display) of the target computer 106 if the attempt to access the web service is successful. At block 306, the target computer 106 displays an image for each of the web services that it attempted to access. If the target computer 106 was successful in accessing a web service, then the image generated by the web service is displayed. If the target computer 106 was not successful in accessing a web service, then the target computer 106 displays an image unique only to the target computer 106 (i.e., the image does not include information from the web service).

At block 308, the mobile device 102 captures the image(s) on the target computer 106. In an embodiment, this is performed by the user taking a picture of the images. In other embodiments other manners of capturing the image are implemented, such as, but not limited to scanning or reading a barcode (when the image is barcode). At block 310, the mobile device 102 transfers the VM state and memory contents to the target computer 106. In an embodiment, the transfer is started based on at least one of the captured images being an image generated by a web service from the list of web services provided by the mobile device 102 that the target computer 106 successfully accessed. At block 312, the mobile device 102 provides the target computer 106 access to the VM data. In an embodiment, this is implemented by the mobile device 102 setting up data tunnels to, for example, a NAS located on the mobile device. In an embodiment, the VM data accessible by the target computer 106 can be based on which web services the target computer 106 successfully accessed. In embodiments, temporary and rescindable virtual private network (VPN) access can be granted to storage area network (SAN) or NAS storage holding metadata or data utilized by the VM migration.

The process shown in FIG. 3 can be performed locally by a target hypervisor 112 or can be provided using a third party web service to create a uniform and trusted encoded mark encapsulating hardware and security information about the potential target computer 106 and target hypervisor 112.

The process shown in FIG. 3 is just one example of how security can be determined for a VM migration. In other embodiments, VMs are encrypted such that the fingerprint of the person migrating the VM is required to unencrypt the VM before execution is resumed. This might for instance allow VMs to be migrated to any secondary host/hypervisor if the VM migration is initiated by a trusted fingerprint, that is the person who moved the VM from a source hypervisor to their mobile device as transient storage, to be further instantiated on a target hypervisor at some later time only after the mobile device reads a matching fingerprint to the encrypting fingerprint at migration initiating time to the secondary host. Furthermore, the mobile device may log the migration, time of migration, and information extracted or otherwise derived from the encoded mark presented on the target machine at some centralized location for security audits.

Figure 4:
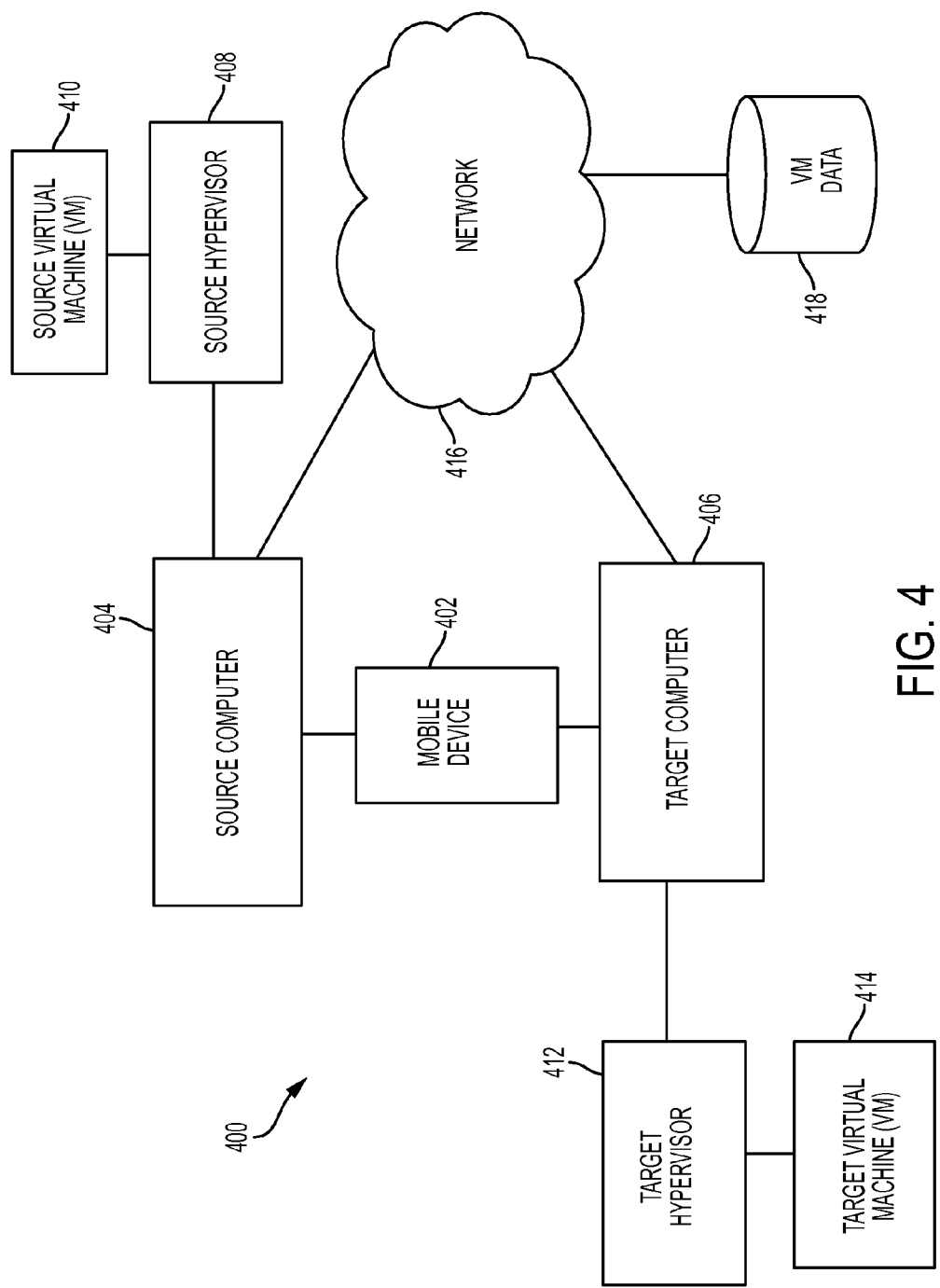
FIG. 4 is a block diagram of a system for performing VM migration using a mobile device in accordance with an embodiment.

Turning now to FIG. 4, a block diagram of a system 400 for performing VM migration using a mobile device is generally shown in accordance with an embodiment. FIG. 4 includes a source computer 404 that executes a source hypervisor 408 and source VM 410. The system in FIG. 4 also includes a mobile device 402 connected to the source computer 404 for requesting the VM migration and for receiving the packaged source VM. Also shown in FIG. 4 is a target computer 406 that executes a target hypervisor 412 and a target VM 414, and that can be connected to the mobile device 402. The system shown in FIG. 4 is similar to the system shown in FIG. 1, however in FIG. 4 the data associated with the source VM 110 and the resulting target VM 114 is stored in a storage device 418 that is accessed via a network 416. The storage device can be configured as NAS and accessed by both the source computer 404 and the target computer 406.

Turning now to FIG. 5, a block diagram of a computer system 500 for VM migration is generally shown in accordance with an embodiment. Systems and methods for VM migration may be implemented in hardware, software (e.g., firmware), or a combination thereof. In some embodiments, the methods may be implemented, at least in part, in hardware and may be part of the microprocessor of a special or general-purpose computer system 500, such as a mobile device, personal computer, workstation, minicomputer, or mainframe computer.

In some embodiments, as shown in FIG. 5, the computer system 500 includes a processor 505, memory 510 coupled to a memory controller 515, and one or more input devices 545 and/or output devices 540, such as peripherals, that are communicatively coupled via a local I/O controller 535. These devices 540 and 545 may include, for example, a printer, a scanner, a microphone, and the like. Input devices such as a conventional keyboard 550 and mouse 555 may be coupled to the I/O controller 535. The I/O controller 535 may be, for example, one or more buses or other wired or wireless connections, as are known in the art. The I/O controller 535 may have additional elements, which are omitted for simplicity, such as controllers, buffers (caches), drivers, repeaters, and receivers, to enable communications.

The I/O devices 540, 545 may further include devices that communicate both inputs and outputs, for instance disk and tape storage, a network interface card (NIC) or modulator/demodulator (for accessing other files, devices, systems, or a network), a radio frequency (RF) or other transceiver, a telephonic interface, a bridge, a router, and the like.

The processor 505 is a hardware device for executing hardware instructions or software, particularly those stored in memory 510. The processor 505 may be a custom made or commercially available processor, a central processing unit (CPU), an auxiliary processor among several processors associated with the computer system 500, a semiconductor based microprocessor (in the form of a microchip or chip set), a macroprocessor, or other device for executing instructions. The processor 505 includes a cache 570, which may include, but is not limited to, an instruction cache to speed up executable instruction fetch, a data cache to speed up data fetch and store, and a translation lookaside buffer (TLB) used to speed up virtual-to-physical address translation for both executable instructions and data. The cache 570 may be organized as a hierarchy of more cache levels (L1, L2, etc.).

The memory 510 may include one or combinations of volatile memory elements (e.g., random access memory, RAM, such as DRAM, SRAM, SDRAM, etc.) and nonvolatile memory elements (e.g., ROM, erasable programmable read only memory (EPROM), electronically erasable programmable read only memory (EEPROM), programmable read only memory (PROM), tape, compact disc read only memory (CD-ROM), disk, diskette, cartridge, cassette or the like, etc.). Moreover, the memory 510 may incorporate electronic, magnetic, optical, or other types of storage media. Note that the memory 510 may have a distributed architecture, where various components are situated remote from one another but may be accessed by the processor 505.

The instructions in memory 510 may include one or more separate programs, each of which comprises an ordered listing of executable instructions for implementing logical functions. In the example of FIG. 5, the instructions in the memory 510 include a suitable operating system (OS) 511. The OS 511 essentially may control the execution of other computer programs and provides scheduling, input-output control, file and data management, memory management, and communication control and related services.

Additional data, including, for example, instructions for the processor 505 or other retrievable information, may be stored in storage 520, which may be a storage device such as a hard disk drive or solid state drive. The stored instructions in memory 510 or in storage 520 may include those enabling the processor to execute one or more aspects of the systems and methods for performing a VM migration in accordance with embodiments described herein.

The computer system 500 may further include a display controller 525 coupled to a display 530. In some embodiments, the computer system 500 may further include a network interface 560 for coupling to a network 565. The network 565 may be an IP-based network for communication between the computer system 500 and an external server, client and the like via a broadband connection. The network 565 transmits and receives data between the computer system 500 and external systems. Embodiments can also provide remote direct memory access (RDMA) or RDMA over other mediums such as, but not limited to TCP/IP. In some embodiments, the network 565 may be a managed IP network administered by a service provider. The network 565 may be implemented in a wireless fashion, e.g., using wireless protocols and technologies, such as WiFi, WiMax, etc. The network 565 may also be a packet-switched network such as a local area network, wide area network, metropolitan area network, the Internet, or other similar type of network environment. The network 565 may be a fixed wireless network, a wireless local area network (LAN), a wireless wide area network (WAN) a personal area network (PAN), a virtual private network (VPN), intranet or other suitable network system and may include equipment for receiving and transmitting signals.

Systems and methods for performing VM migration according to this disclosure may be embodied, in whole or in part, in computer program products or in computer systems 500, such as that illustrated in FIG. 5.

Technical effects and benefits include the ability to utilize the same VM from different geographic locations without having to transport or carry a laptop or other computer from place to place. The VM is stored on a mobile device, such as a mobile telephone, which can allow a user to have an additional function on a device which is already carried by a typical user.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiments were chosen and described in order to best explain the principles of the invention and the practical application, and to enable others of ordinary skill in the art to understand the invention for various embodiments with various modifications as are suited to the particular use contemplated.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed:

1. A system for migrating a virtual machine (VM), the system comprising:
    a memory having computer readable instructions; and
    a processor for executing the computer readable instructions, the computer readable instructions including:
    requesting, by a mobile device, a source computer to capture a state and memory contents of a VM executing on the source computer, the VM including the state, the memory contents, and data;
    storing the state and the memory contents of the VM on the mobile device;
    determining, by the mobile device, security information about a target computer, the determining including:
        communicating, by the mobile device, to the target computer a list of remote web services used by the VM, wherein the target computer is configured to attempt to access at least one remote web service of the list of remote web services, wherein the at least one remote web service is configured to generate a first code to be displayed on a user interface of the target computer upon the attempt by the target computer to access the at least one remote web service being successful and to generate a second code to be displayed on the user interface of the target computer upon the attempt of the target computer to access the at least one remote web service being unsuccessful, wherein the second code is unique only to the target computer and does not include information from the at least one remote web service; and
        capturing, by the mobile device, one or more images of the user interface of the target computer by taking pictures, by the mobile device, of the user interface of the target computer;
    initiating a migration of the VM to the target computer based on detecting, by the mobile device, that at least one of the captured images of the user interface of the target computer includes the first code that was generated by the at least one remote web service from the list of remote web services, the initiating including sending the stored state and memory contents of the VM from the mobile device to the target computer;
    initiating an activation of the VM on the target computer; and
    providing the target computer access to at least a subset of the data of the VM, the subset selected based on the security information.

2. The system of claim 1, wherein the data of the VM is stored on the mobile device.

3. The system of claim 1, wherein the data of the VM is stored on a storage device separate from the mobile device.

4. The system of claim 1, wherein the computer readable instructions further comprise:
    storing security metadata for the VM executing on the source computer on the mobile device, wherein the determining security information about a target computer is based on the security metadata.

5. The system of claim 1, wherein the determining security information about a target computer is based on at least one of an image and a fingerprint.

6. The system of claim 1, wherein the mobile device is a mobile telephone.

7. The system of claim 1, wherein the first code displayed by the target computer on the user interface is a quick response (QR) code.

8. The system of claim 1, wherein the first code displayed by the target computer on the user interface is a barcode.

9. The system of claim 1, wherein the image is generated by the target computer in response to the target computer attempting to access each of the web services in the list.

10. A computer program product for migrating a virtual machine (VM), the computer program product comprising a computer readable storage medium having program code embodied therewith, the program code executable by a processor for:

requesting, by a mobile device, a source computer to capture a state and memory contents of a VM executing on the source computer, the VM including the state, the memory contents, and data;

storing the state and the memory contents of the VM on the mobile device;

determining, by the mobile device, security information about a target computer, the determining including:

communicating, by the mobile device, to the target computer a list of remote web services used by the VM, wherein the target computer is configured to attempt to access at least one remote web service of the list of remote web services, wherein the at least one remote web service is configured to generate a first code to be displayed on a user interface of the target computer upon the attempt by the target computer to access the at least one remote web service being successful and to generate a second code to be displayed on the user interface of the target computer upon the attempt of the target computer to access the at least one remote web service being unsuccessful, wherein the second code is unique only to the target computer and does not include information from the at least one remote web service; and capturing, by the mobile device, one or more images of the user interface of the target computer by taking pictures, by the mobile device, of the user interface of the target computer;

initiating a migration of the VM to the target computer based on detecting, by the mobile device, that at least one of the captured images of the user interface of the target computer includes the first code that was generated by the at least one remote web service from the list of remote web services, the initiating including sending the stored state and memory contents of the VM from the mobile device to the target computer;

initiating an activation of the VM on the target computer; and providing the target computer access to at least a subset of the data of the VM, the subset selected based on the security information.

11. The computer program product of claim 10, wherein the data of the VM is stored on the mobile device.

12. The computer program product of claim 10, wherein the data of the VM is stored on a storage device separate from the mobile device.

13. The computer program product of claim 10, wherein the program code is further executable by the processor for:

storing security metadata for the VM executing on the source computer on the mobile device, wherein the determining security information about a target computer is based on the security metadata.

14. The computer program product of claim 10, wherein the determining security information about a target computer is based on at least one of an image and a fingerprint.

15. The computer program product of claim 10, wherein the mobile device is a mobile telephone.

16. The computer program product of claim 10, wherein the first code displayed by the target computer on the user interface is a quick response (QR) code.

17. The computer program product of claim 10, wherein the first code displayed by the target computer on the user interface is a barcode.

18. The computer program product of claim 10, wherein the image is generated by the target computer in response to the target computer attempting to access each of the web services in the list.

* * * * *